United States Patent Office 3,281,630
Patented Oct. 25, 1966

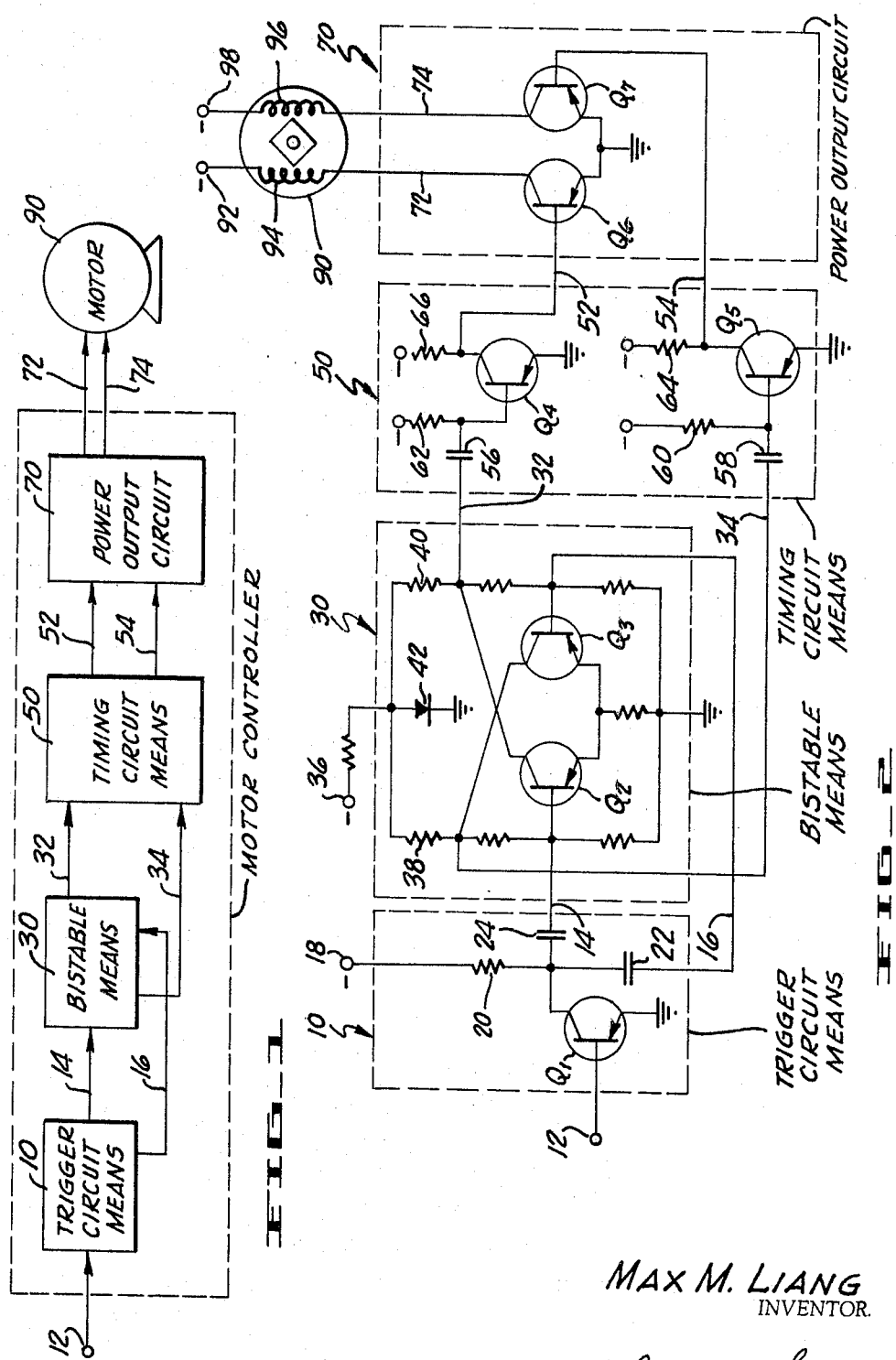

3,281,630
PULSE WIDTH MODULATOR FOR STEP MOTOR
Max M. Liang, San Mateo, Calif., assignor to Ampex Corporation, Redwood City, Calif., a corporation of California
Filed Jan. 2, 1964, Ser. No. 334,989
7 Claims. (Cl. 318—138)

This invention relates to a motor controller means and a method for controlling a motor. More particularly this invention relates to a controller for a stepping motor and a method for controlling such a motor.

In the past it has been common practice to energize a single phase synchronous stepping motor such as that described in U.S. Patent 2,834,896 with a regulated power supply. In such motor controllers the regulated power supply is connected to an R–L circuit formed by the motor winding and in some cases resistances in addition to the resistance of the winding. The very accurate control of the voltage from the regulated voltage will enable a given current level to be reached in a selected time with accuracy and reliability adequate for certain applications. If the regulated voltages have plus or minus 10% variations there may be insufficient driving current in the low voltage case to energize the motor and overheating may result in the high voltage case. To obtain regulated voltages that avoid these shortcomings requires considerable complexity and cost. In addition, as the stepping rate of the motor increases and the period in which a given current level is to be achieved is shortened, voltage variations or variations in the circuit parameters become more critical. It should also be noted that when the stepping motor is used in an incremental record and reproduce system having a write verify subsystem such as the one described in U.S. patent application S.N. 355,260, filed Mar. 27, 1964, the consistency of medium or tape velocity profile and hence motor velocity is important.

In an effort to provide a system compatible with a high speed incremental record and reproduce system and to overcome the above shortcomings of regulated voltage motor controllers it was recognized that the operation of a high speed stepping rate motor is a function of the charge supplied to the motor winding. If a given amount of charge can be transmitted to the motor within a period determined by the stepping rate, the specific value of the current is relatively unimportant. By controlling the amount of charge delivered to the motor winding satisfactory driving conditions are reliably obtained with a relatively simple electrical arrangement.

With these facts in mind, a motor controller has been invented that generally comprises a power circuit means that is controlled by a timing circuit means to periodically deliver a substantially constant amount of charge to the windings of a motor regardless of the value of an unregulated voltage supply which energizes the motor controller. The timing circuit is enabled each time a move command signal is supplied to the motor controller. A move command signal is a control signal which is intended to enable or operate the motor to move tape to a given position.

The method of controlling the charging of the motor windings comprises the steps of deriving current pulses from an unregulated voltage supply, controlling or forming the pulses so that the product of its amplitude and duration equals a constant value of charge and transmitting the pulses to the windings of the stepping motor.

It is the general object of the invention to provide an improved motor controller and a method for controlling a motor;

Another object of the invention is the provision of a motor controller and a method for controlling the motor wherein a constant charge is supplied to the windings of the motor;

Another object of the invention is to provide a motor controller that is compatible with operating a stepping motor at a high rate;

Another object of the invention is to provide a motor controller that may be adapted to control a motor to move a recording medium at a consistant velocity profile;

Another object of the invention is to provide a motor controller that does not require a complicated resulted voltage supply;

Another object of this invention is to provide a motor controller which is relatively simple, economical and reliable.

These and other objects of the invention will be more fully appreciated when the specification is considered in conjunction with the drawings wherein:

FIGURE 1 is a functional block diagram of the motor controller; and

FIGURE 2 is an electrical schematic diagram of the motor controller.

Referring to FIGURE 1 the motor controller comprises a trigger circuit means 10 that is connected to the input terminal 12 which receives move commands or input signals. The trigger circuit means 10 is adapted to generate a plurality of outputs and more particularly two outputs that are connected to a bi-stable means 30 by the conductors 14 and 16.

The bi-stable means 30 may be any of the well known electronic means that assumes one stable state or another and moves from the one stable state to the other stable state when an input signal is supplied to one of a plurality of its input terminals. More particularly, the bi-stable means 30 supplies an output to one of the conductors 32 or 34. If an output is supplied to the conductor 32 and an input trigger pulse is received the output at the conductor 32 will be substantially turned off and an output will be supplied to the conductor 34. The conductors 32 and 34 of the bi-stable means 30 are connected to a timing circuit means 50.

The timing circuit 50 means functions to enable a power circuit 70 to energize a motor 90 or more particularly to turn on one of the outputs 72 or 74 of the power circuit 70 for a period of time that enables it to supply a substantially constant amount of charge to a motor winding. The timing circuit means 50 is in turn connected to the power circuit 70 by two conductors 52 and 54. The exact period which the timing circuit means 50 enables the power output circuit 70 to energize the motor 90 is not usually constant but varies according to the level of the voltage supplied by the unregulated voltage so that a constant amount of charge is supplied to the motor windings.

A specific embodiment of the invention is shown in FIGURE 2. In this embodiment of the invention the trigger circuit means 10 comprises a transistor Q1 having its base connected to the input terminal 12, its emitter connected to ground and its collector connected to the input terminal 18 via a collector load resistor 20. The terminal 18 is connected to the negative terminal of an unregulated voltage supply (not shown). From this it can be seen that when a negative input pulse or command is supplied to the input terminal 12, the transistor Q1 will turn on and supply a pulse to the conductor 14 and the conductor 16 via the coupling capacitors 22 and 24. The conductors 14 and 16 are in turn connected to the bis-stable means 30.

The bi-stable means 30 is a typical bi-stable multivibrator including a pair of transistors Q2 and Q3. Bi-stable means are well known in the art and are described in such literature as "Basic Theory and Application of Transistors," Department of the Army, March 1959, TM11–690, pages 200–205. The only aspect of the circuit worthwhile noting specifically is that the bi-stable means 30 is energized by the negative terminal of an unregulated voltage supply connected to the input terminal 36. The input terminal 36 is in turn connected to the collectors of the transistors Q2 and Q3 by the usual collector load resistors 38 and 40 and to a Zener diode 42 that is connected to ground and functions to regulate the voltage supplied to the collector load resistors 38 and 40. This regulation is not of course as severe or demanding as the regulation incident to the control of the motor as described in the introductory portion of the specification. The collectors of the transistors Q2 and Q3 and the load resistors 38 and 40 are connected to the output terminals of the bi-stable means 30 and consequently to the conductors 32 and 34 which energize or enable the timing circuit 50. The bi-stable means 30 operates so that when the pulses are supplied by the trigger circuit means 10 via the conductors 14 and 16 an output will be produced at one of the conductors 32 or 34.

The output from the bi-stable means 30 which appears on either conductor 32 or 34 is supplied to the timing circuit means 50 and more particularly to a pair of timing capacitors 56 and 58. The timing capacitors 56 and 58 cooperate with the unregulated voltage, the Zener diode 42, the collector load resistors 38 and 40, the resistors 60 and 62 and the transistors Q4 and Q5 to form a timing circuit. The resistors 60 and 62 are connected to the negative terminal of an unregulated voltage supply as are the collector load resistors 64 and 66.

It can be seen that the portion of the timing circuit 50 that includes Q4 is a replica of the portion of the timing circuit 50 that includes transistor Q5. The transistors Q4 and Q5 and their associated circuit elements perform substantially the same functions at different times dependent on which winding of the motor is being energized. The transistors Q4 and Q5 are normally turned on so that its collector is essentially at ground potential causing the conductors 52 and 54 connected to the power output circuit 70 to be at the same potential. When an output is developed by the bi-stable means 30 at an output conductor 32 or 34 the capacitor 56 or 58 is charged by the circuit that includes the Zener diode 42 and a resistor 38 or 40. This charging of the capacitor 56 or 58 places a bias on the base of one of the transistors Q4 or Q5 that turns it off. When the transistor Q4 or Q5 turns off a negative potential exists at the collector of the off transistor and is in turn supplied to the conductor 52 or 54. The off transistor Q4 or Q5 will remain substantially non-conductive for a period determined by the time which it takes the unregulated voltage supply connected to the resistor 60 or 62 to charge the capacitor 56 or 58 to a potential that is adequate to bias the transistor Q4 or Q5 to an "on" condition.

The power circuit 70 comprises a pair of transistors Q6 and Q7 having their bases connected to the conductors 52 and 54 respectively. The emitters of the transistors Q6 and Q7 are connected to ground and their collectors connected to the power output terminal 72 and 74. The power output terminals 72 and 74 are in turn connected to the motor windings 94 and 96, respectively, which have terminals 92 and 98 connected to the negative terminal of the same unregulated voltage supply that is connected to resistors 60, 62, 64 and 66 and terminals 18 and 36.

From the description in the above it can be seen that normally the conductors 52 and 54 connected to the power output circuit will supply an essentially ground potential to the bases of the transistors Q6 and Q7 which make up the power output circuit 70. The turning off of one of the transistors Q4 or Q5 by the bi-stable means 30 will apply a negative potential to the base of one of the transistors Q6 or Q7. This will cause the transistor Q6 or Q7 to be turned on for a period that enables a constant amount of charge to be delivered to one of the oppositely wound windings 94 or 96 of the motor 90. If the transistor Q6 is first enabled and turned on, assuming transistor Q2 has also been energized, the next input signal to the input terminal 12 will cause the transistor Q7 to be enabled or turned on.

In summary a move command or signal is supplied to the input terminal 12 which results in the trigger circuit means 10 simultaneously supplying trigger pulses to the conductors 14 and 16 of the bi-stable means 30. The trigger pulses cause the bi-stable means 30 to supply an output to one of its conductors 32 or 34 depending on the state of the bi-stable means 30 when the pulse is delivered. If the transistor Q2 is conducting and supplying an output to the conductor 32, the triggering pulse will cause the transistor Q2 to turn off and the transistor Q3 to turn on and supply an output to the conductor 34. The supplying of an output to the conductor 32 will result in the transistor Q5 turning on for a period of time determined by the level of the unregulated voltage. This is because the bi-stable means 30 charges the capacitor 56 via a controller voltage and it is then necessary for the unregulated voltage to charge the capacitor to overcome this controlled voltage or charge so that the transistor Q5 can again be turned on. The turning off of the transistor Q5 results in a negative potential being applied to the base of the transistor Q7 which turns the transistor 37 on thereby enabling the unregulated voltage supply connected to the terminals 98 to energize the winding 96 for a period of time as controlled by the timing circuit 70. The switching of the transistor Q7 for a period of time enables a substantially constant amount of charge to be delivered to the winding 96. When the transistor Q5 is again turned on, the transistor Q7 will be turned off and the energization of the winding 94 will be completed. The next trigger pulse from the trigger circuit means 10 will result in the transistor Q4 being turned off and the transistor Q6 being turned on to energize the winding 94 with a substantially constant amount of charge.

From the above description it can be seen that an improved motor controller and method for controlling a motor have been provided. This invention does not require a complicated regulated voltage supply and is capable of delivering a constant charge to the windings of the motor. The motor controller also provides a means for energizing one winding of the motor and then the other winding of the motor in a manner which is compatible with operating a stepping motor at a high rate. In addition, the invented motor controller is economical and reliable.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. A motor controller for accepting move command signals and alternately energizing the windings of a multi-winding motor with constant charge signals regardless of variations in the controller circuit parameters and of fluctuations in an energizing unregulated voltage supply coupled thereto, the combination comprising:

circuit means including voltage regulating means coupled to the unregulated voltage supply, said circuit means disposed to accept the move command signals and generate regulated pulses in response to the move command signals;

timing circuit means coupled to said circuit means to accept said regulated pulses therefrom and generate timed output pulses having time durations representative of the unregulated voltage supply fluctuations; and power output circuit means coupled to the timing circuit means and responsive to the timed pulses, said power output circuit means being coupled to the motor multi-windings to alternately energize same with the constant charge signals in response to the timed pulses introduced to the power output circuit means.

2. The motor controller of claim 1, wherein the circuit means further comprises;

trigger circuit means for accepting the move command signals and generating a plurality of outputs in response thereto; and bi-stable means having input and output terminals and coupled at its input terminals to the trigger circuit means and responsive to the plurality of outputs therefrom to alternate successively between two stable states.

3. The motor controller of claim 2 wherein said voltage regulating means comprises a zener diode coupled between the unregulated voltage supply and the bi-stable means thereby providing substantially regulated voltage pulses.

4. The motor controller of claim 3 wherein the trigger circuit means introduces two simultaneous output pulses to the bi-stable means to alternate the latter between two stable states, and the voltage regulating means includes a pair of load resistors connected to the output terminals of the bi-stable means.

5. The motor controller of claim 1 wherein said timing circuit means further comprises a plurality of capacitors disposed to accept said regulated pulses from the circuit means, said capacitors being charged in proportion to the unregulated voltage supply fluctuations.

6. The motor controller of claim 5 wherein said timing circuit means further comprises a plurality of transistors having base, emitter and collector electrodes; the base electrodes being connected to respective capacitors, the emitter electrodes being connected to ground, and the collector electrodes being coupled to the unregulated voltage supply, wherein the output from the timing circuit means is taken from the collectors and is of a time duration proportional to the unregulated voltage supply fluctuation.

7. The motor controller of claim 6 wherein the power output circuit means further comprises a pair of transistors having base, emitter and collector electrodes; the base electrodes being connected to respective collectors of the timing circuit means transistors, the emitter electrodes being connected to ground, and the collector electrodes being connected to the windings of the multi-winding motor.

References Cited by the Examiner

UNITED STATES PATENTS 3,117,268 1/1964 Madsen _____ 310—49
3,165,684 1/1965 Ensink et al. _____ 310—49

ORIS L. RADER, *Primary Examiner.*

S. GORDON, G. SIMMONS, *Assistant Examiners.*